Patented Feb. 11, 1947

2,415,439

UNITED STATES PATENT OFFICE 2,415,439

PURIFICATION OF LIQUIDS BY LIGNIN

Wyly Dewey Nelson, Reserve, La.

No Drawing. Application January 19, 1942,
Serial No. 427,293

5 Claims. (Cl. 210—2)

The present invention relates to the purification of sugar and other similar liquors by lignins, and particularly by the use of lignin in aqueous solution or suspension.

Although not specifically limited thereto, the present invention will be particularly described in its application to the purification of raw or crude cane sugar liquors requiring purification from suspended or dispersed impurities by the use of suspensions of lignin or solutions of lignin in alkaline media.

It is among the objects of the present invention to provide an improved process and procedure for purifying and clarifying various sugar-containing juices or liquors or other solutions which, by the use of lignin, will permit more effective clarification and purification with a reduced expenditure of chemicals or purification agents.

Another object is to provide a method of purifying sugar juices which will permit the use of relatively inexpensive readily available purifying or clarifying agents and will enable more complete clarification and purification in a shorter time.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accomplishing the above objects, it has been found most desirable to utilize a lignin material extracted from wood, bagasse or similar cellulosic materials, which lignin is known as alkali lignin and which is desirably extracted by a soda or sulphate process as contrasted to a sulphite process, which lignins, after purification and preferably in aqueous suspension or in alkaline solution, are added to the crude sugar liquors at any stage and/or in combination with other steps of purification.

Preparation of the lignin

According to a preferred procedure of the present invention, the lignin used is extracted from cornstalks, hard or soft woods, or bagasse, by digestion with dilute alkali solutions such as dilute solutions of sodium hydroxide. This solution, after extraction of the wood or woody material, is acidified to precipitate the lignin, which may be removed by filtration, decantation, or centrifuging and then washed free of acid.

The crude lignin in this precipitated state may then be used as such in aqueous suspension or solution with an alkali, or it may be dissolved in alkali and re-precipitated one or more times to aid in the purification.

In some instances, although this is not preferred, the lignin may be combined with alkali earth or earth metals such as calcium, aluminum or magnesium, to give compounds of lignin with these metals, which may be used for treating purposes.

In the preferred procedure, however, the lignin after precipitation with sufficient acidification to remove all cations, followed by washing to remove the acid, then may be dispersed in water to form a suspension which is substantially neutral and is substantially free of both alkali and acid.

It also has been found particularly suitable to use lignins which are dissolved in dilute alkali.

It is found in both these cases that the lignin has a tendency to, and is effective not only to, coagulate the various suspended or dispersed impurities, but it also apparently condenses upon itself to form a particularly effective flock, which removes substantially all of the impurities in the suspension.

In the preferred procedure of extracting lignin from soda black liquor, the lignin may be precipitated by acidification as by bubbling carbon dioxide therethrough, for example in the form of flue gas, and the precipitated lignin may then be washed free of acid and placed in water suspension or solution or dried to a powder.

Where the lignin is removed from the soda black liquor by treatment of such liquor with milk of lime, or water soluble magnesium or aluminum compounds, the precipitated calcium, magnesium or aluminum lignin compounds may be washed free of impurities and then dispersed in the form of lime, magnesium or aluminum compounds in aqueous media. As a convenient source of water soluble magnesium compounds for treatment of soda black liquor, sea water may be employed.

It is also possible to treat the precipitated calcium, magnesium and aluminum lignin compounds before use to purify the sugar or other liquors, to remove the calcium, magnesium or aluminum ions as by treatment with acid, followed by washing out the acid, or these precipitated lignin compounds may be solubilized by treatment with alkali.

Generally, it is not desired to dry out the lignin or lignin compound before its dispersion or solution in aqueous treating media, since the lignin or lignin compound after drying out is not as readily water soluble. The precipitated mass of lignin or lignin compounds derived from the soda black liquor may be kept indefinitely in the form of a wet paste, and if desired such wet paste, preferably after washing free of sodium chloride and other impurities, could be used for many other purposes, such as a fertilizer, in cements, etc.

In the extraction of lignin from bagasse, the extraction may take place during the final operations of removing the cane juice, particularly at the very high pressures used in the last sets of rolls used for pressing the cane. For example, a dilute solution of sodium hydroxide or other alkali or salts such as sodium sulfate, trisodium phosphate, etc., might be added to the mat of bagasse just ahead of the last mill to cause the bagasse to absorb the dilute alkali very thoroughly and, as the bagasse passes through the three rolls of the last mill, the dilute alkali will be expressed and will take with it a percentage of lignin from the bagasse.

The juice from the last mill may be used as a source of both lignin and sugar and may be returned to previous mills or sent directly into the mixed cane juice stream, or, if desired, the lignin may be removed therefrom by acidification.

If desired, a small amount of dilute caustic soda or other alkali may be added to the maceration water just before the last mill so that at all times a certain amount of lignin will be extracted from the crushed cane on the last set of rolls, with the result that lignin will be automatically passed into the juice that is thereafter to be clarified.

On the other hand, the lignin may be extracted from the bagasse after all cane juice has been removed therefrom by boiling such bagasse with dilute alkali, sodium sulfate, etc., followed by precipitation of the lignin with acidification, and it is possible to have the boiling alkali or neutral salts flow through a series of batches of bagasse with the fresh alkali or salts contacting the bagasse which has been most thoroughly extracted and the more exhausted alkali treating the fresh bagasse so that a most effective extraction of lignin is obtained.

In dissolving the lignin in alkali, it is usually found most satisfactory to form the wet lignin after precipitation, treatment with acids to remove cations and washing with water to remove acid, into paste or cake form, which may be kept in containers or storage, ready for use.

Then the wet cake or paste of lignin may be dissolved in dilute alkali or pugged or mixed with sufficient alkali so that it will readily dissolve in water or in the liquors to be purified.

This wet paste or cake form of lignin is much more effective than dry powdered lignin. However, dried lignin may also be used.

*Lignin in purification of cane sugar juices*

In using this lignin as above stated, in the purification of cane sugar juices, these juices, for example, may have been obtained by expressing the cane upon passage through steel rolls, and the juice obtained contains many impurities, including, for example, bits of dirt, cane wax, bits of fiber, albumin, proteins, etc., in suspension.

This juice, when extracted from the cane, is usually treated with lime, heated to a boil and then allowed to settle with the clear juice being decanted. However, rarely is complete coagulation obtained, or the impurities are very slow in settling, and the decanted juice is not always clear, resulting in many disadvantageous results in the process of refining and in the final refined sugar.

To aid in the coagulation and to assure more rapid coagulation or a more pure and better clarified juice or to assure a lesser time of treatment, the lignin preparations of the present application may be added to the sugar juices at various stages in the purification or clarification thereof, as indicated by the following:

For example, the lignin dissolved in dilute alkali or in water suspension or in the form of a compound with magnesium, calcium or aluminum, may be added (a) To the cane juice in the cold, which cane juice may be heated, if desired, to hasten the coagulation. The coagulation without heat is particularly helpful where it is desired to remove the wax from the juices, which wax tends to become dispersed and less readily separable when heated and/or in the presence of lime;

(b) To the cane juice, together with the powdered lime or milk of lime or before or after the powdered lime or milk of lime is added. Desirably, the lignin preparation is added in the cold before or after adding the lime and before heating to coagulate the impurities, although the lignin in some instances may be added after liming in the cold with or without subsequent heating. The coagulation is preferably caused to take place in the cold and the precipitate which is formed is desirably removed before further treatment of the cane juice or other sugar liquor.

(c) The lignin preparation may be added to the cold raw cane juice before, during or after forming precipitates of calcium, aluminum and/or magnesium, preferably in the cold, or if desired, after heating. For example, with calcium phosphate precipitation, the lignin preparation may be added before or after the formation of a tricalcium phosphate precipitate. The tricalcium phosphate precipitate cooperates with the lignin to achieve a more thorough purification and clarification of the liquid.

In producing this tricalcium phosphate precipitate, lime, phosphoric acid and lignin may be added together to this sugar liquor in any order, and apparently the lignin has the effect of decreasing the pH of the solution during the precipitation or coagulation.

(d) The lignin preparation may be added to the crude sugar liquors, alone or together, with or before, or after aluminum sulphate, sodium aluminate and/or calcium carbonate, lime or milk of lime.

(e) In making invert sugar liquors, the lignins may be added before or after the inversion or before or after the addition of the acid causing the inversion, whether said acid be phosphoric acid, sulphuric acid, sulfur dioxide gas or carbon dioxide gas, or after such acidic material has been neutralized if desired.

(f) The lignin preparation may be added to the remaceration juices, for example, in a compound maceration system in the mills for grinding the sugar cane to clarify the remaceration juices before these juices are returned to the mills.

It is not necessary in all cases when the lignin is added in this manner to remove the precipitate, since the mat of bagasse acts as a filter itself to purify the remaceration juices.

In one preferred form, the lignin preparation is added to the clear hot maceration water just before the last mill.

(g) To the mills to bring about clarification in the process of milling, as the result of which the mixed juice may be sent to the boiling house free of suspended matter. In this manner the juice flowing from the crusher or the juices flowing from the crusher and first mill together may be treated with lignin and after the coagulation takes place, these juices may be brought back over the mat of bagasse before being sent to the boiling house, the mat of bagasse acting as a filter.

(h) To the mills in the Petree-Dorr process of compound clarification to either the primary or secondary juices.

(i) To the defecation muds or precipitates to bring about a better coagulation of suspended matter and speed up and aid filtration, particularly where vacuum filters are utilized, together, with, or before, or after addition of keiselguhr, filtercel or other filter aids, and also to remove any fine particles of such filter aids from the solution.

(j) Together, with, before, or after the addition of activated carbon to aid in the purification and to remove any fine particles of activated carbon which may have been dispersed in the liquid.

(k) To scums from the clarifiers and sugar refineries, where phosphoric acid and lime are used for clarification, to enable more complete recovery from such scums.

(l) To beet sugar juice as it comes from diffusion cells with or without heating.

Although the above procedures have been particularly described for cane sugar juices, it is obvious that they may be utilized in connection with various other types of beet sugar juices, sorghum juices, syrups, molasses, fruit juices and in many other connections where it is desirable to remove impurities, particularly suspended or dispersed impurities from aqueous solution or dispersion as, for example, in the removal of coal dust from wash waters, the clarification of factory effluents, the purification of brewery slurries, the treatment of refuse from distillation of the purification of aqueous suspension of metallic materials or metallic ores, etc.

In all of the above procedures, the coagulate which is produced may be removed by sedimentation, filtration, aeration, flotation, centrifuging or combinations of these various procedures.

Although the preferred lignin preparation is a dispersion of lignin in water which may be substantially neutral, which less desirably may be slightly acidified, it is also possible to use alkaline solutions of lignin as well as other types of solutions and dispersions of lignin.

Where the cane wax is most effectively to be removed, it is desirable at all times either to use a cold procedure or to heat, but preferably not to a degree which will cause dispersion or melting of the cane wax.

The clear juices which result from the lignin clarification as above described may be readily concentrated to a syrup without neutralization with lime or soda ash, and this concentration may be done rapidly so that no inversion of the sugar will take place.

Where, however, invertase is added to produce an invert syrup or molasses, it is desirable that lime be omitted in the clarification procedure, since the invert sugar will be obtained in this manner with a highly reduced ash or salt content. The product may then be neutralized.

The color of the final syrups or molasses which are made by the above procedure will be very light and these materials will command a substantial premium.

Moreover, a very good grade of white sugar may be prepared from the lignin clarified juice, particularly after the juice has been neutralized with soda ash or caustic soda. In such procedures it is usually desirable to filter the lignin clarified juice through a filter aid.

Where the lignin purification process described above is used in connection with sorghum juice or sorgo juice, it is found that heat may preferably be omitted, since this will result in less rupturing or expansion of the starch granules and a more complete removal of the suspended starch particles. Apparently in sorgo juices, the acidity is very high, and the lignin acts effectively at such high acidity, particularly in the cold.

In the preferred procedure with sorgo juice, after the lignin purification in the cold, lime is then added to neutralize the acidity and then the juice is heated and the calcium aconitate may be removed from the thin juice by filtration with the use of a filter aid or after concentration.

In connection with sorgo juices, it is also possible to add the lignin again after the lime has been added, particularly where the lime is used to produce a high alkalinity.

*Example I*

Lignin in water suspension or dissolved in dilute alkali or in the form of a dispersion of calcium, magnesium or aluminum compounds is added in the proportion of ¼ to 1 pound or higher for every 2,000 pounds of juice (the lignin to be calculated upon a dry weight basis). This addition is to the cold raw cane juice and then heat is applied until the juice reaches the boiling point, or the temperature may be elevated to the melting point of the wax in the juice.

The coagulate which is then formed may be removed in the manner described above.

This procedure may be varied by adding lime or milk of lime to the cold raw juice before or after the addition of the lignin, and the amount of lime used may be varied from an ounce to a pound per ton of juice.

The procedure of this example may also be varied by aerating the juice with air, carbon dioxide or even nitrogen.

In this procedure desirably the pH is kept above 7, although the pH may be increased up to 9 or higher with liming of the juice in the cold to bring an increased precipitation of the coloring matters and colloidal impurities.

Where lime is utilized, it is desirable to carry out the coagulation in the cold to prevent harmful action of the lime on the sugars, and the excess lime may be neutralized or removed by treatment with carbon dioxide, phosphoric acid or sulphur dioxide.

*Example II*

A water dispersion or suspension of magnesium, calcium or aluminum lignin compounds is added to the raw cane juice in the proportion of about ½ pound per ton of cane juice in the cold or after slight heating of the cane juice.

Lime may also be added to give a pH varying from 8 to 9 and the coagulated mass may then be removed.

*Example III*

The cane sugar juice may be acidified with sulphuric acid, phosphoric acid, carbon dioxide or sulfadioxide, to lower the pH of the juice to between 4 and 5, for example, to 4.7, which is the isoelectric and precipitation point of many of the proteins and other undesirable colloids in the juice. About ¾ of a pound of dry lignin in aqueous suspension may be added to the cold raw juice before or after the addition of this acid thereto.

The optimum pH for test results will vary for different juices, and when lignin is added first and acid added after, just enough acid should be added to bring about coagulation. However, for best results and for complete clarification, the pH should be between 4 and 5.

After the removal of the coagulate, the sugar solution is neutralized. Where phosphoric acid has been used as the acidification agent, the neutralizing may take place with lime or milk of lime, with the result that tricalcium phosphate will be precipitated.

Aeration of the juice during this acid treatment also greatly aids the coagulation.

Where calcium, magnesium or aluminum lignin compounds are used in aqueous suspension in this acid treatment of the juice, the magnesium and aluminum may be removed as hydroxides upon neutralization with caustic alkali, while the calcium may be removed either as a phosphate or as a sulphate or as a carbonate, and these magnesium, calcium or aluminum precipitations will aid the precipitation of the undesired impurities with the lignin.

It is to be understood that in either example, the lignin may be used by itself in water suspension, or in alkali solution without the need of adding acid or lime to the juice and it will be effective as a clarification agent, by itself.

Aeration of the liquid will greatly aid in the coagulation effected.

Where it is desired to have a low ash content and a very light colored product, it is desirable to omit addition of lime or other inorganic compounds or salts.

It is found by the applicant's process, without the addition of lime or milk of lime or acid, it is possible to obtain a purified or clarified cane juice having a pH very close to that of the raw juice and which is particularly suitable for making edible syrups, invert syrup and molasses.

Where lime is utilized, it is not only possible to add the lignin together with the lime to the cold raw juice, but it is also possible to add the lignin in any of its various forms to a hot lime juice after it leaves the heater and before it goes to the settling tanks.

Example IV

In the clarification of syrups and molasses, the syrup or molasses may be acidified with phosphoric acid to a pH of 4.7 or lower and then lignin in water suspension or dissolved in alkali may be added to produce a coagulate. From ½ to 1¼ pounds of lignin may be added to every 2,000 pounds of the syrup or molasses.

After the impurities have been removed, the phosphoric acid may be neutralized with lime or milk of lime and after removal of the tricalcium phosphate precipitate, the resultant product will be lighter in color, of lower viscosity and will be substantially devoid of objectionable impurities.

The clarification of syrups and molasses may also be carried out at an alkaline pH and when this is done, lime or milk of lime may be stirred into the syrup or molasses, together with, before or after the lignin in aqueous suspension or in alkaline solution.

Where it is desired to reduce the alkalinity of the syrup or molasses in connection with this alkaline treatment procedure, phosphoric acid may be added to the precipitate tricalcium phosphate.

With syrups or molasses, the precipitate may be removed by decantation if the Brix is about 50, although with aeration greater densities may be employed.

Example V

In the clarification of beet sugar juice, the lignin in water suspension or in alkaline solution may be added to the juice as it comes from the diffusion cells, the lignin being added in the amount of about ½ to 1 pound per ton of juice. Desirably, lime is added together with, or before, or after the addition of the lignin.

Example VI

In the clarification of sorgo juices, a water suspension of about 0.1 to 1% of lignin by weight calculated upon a dry basis is added to the cold raw sorgo juice, and after removal of the coagulate, the resultant juice may be filtered with the use of a filter aid in the cold to remove any residual starch granules. Then the juice may be limed, the precipitate removed and concentrated into a syrup or made into syrup.

Aeration is quite helpful in clarification of sorgo juice, and it is desirable to use the water suspension of lignin rather than the alkaline solution, since such alkaline solution tends to form water soluble sodium aconitate. The addition of the lignin suspension may be repeated several times if desired.

In the second precipitation and removal of the coagulation is included most of the calcium aconitate which may be removed by decantation or with a filter aid, desirably in the hot, when the calcium aconitate is more insoluble. By this procedure it is possible to remove the calcium aconitate before the sorgo juice is put into semi-syrup form and without the necessity of prolonged settling, the removal of calcium aconitate according to the present application being before concentration of the thin sorgo juice.

If desired, some lignin in water suspension may also be added to aid in the precipitation of the calcium aconitate, particularly when the latter is hot.

Example VII

In the clarification and purification of distillery waste, factory effluents, beet sugar waste liquors, waste liquors from vegetable and fruit canneries, fish plants, wool scouring plants, wineries, packing house wastes, waste wash waters from the washing of coal, distilleries, etc., from 0.1 to 1% of the lignin in water suspension or dissolved in alkali or, less preferably, in the form of calcium, magnesium or aluminum compounds of lignin is added.

Depending upon the nature of the liquor being purified, the lignin may be added in the cold or in the hot, or the liquor may be subsequently heated and limed, or phosphoric acid may be added to regulate the pH to below or above 7. The resultant coagulates produced according to the present invention may be used as fertilizers or may be incinerated to burn off the organic matter.

With some of the waste liquors above mentioned, instead of using lignin itself, it is possible to use the soda black liquor itself, and this soda black liquor may be mixed with the waste liquor to be purified, together with the sea water where it is desired to form a precipitation of magnesium and lignin compounds.

Many other changes could be effected in the particular features of purification of sugar and other liquors and solutions by lignin and in methods of usage set forth, and in specific details thereof, without substantially departing from the invention intended to be defined in the claims, the specific description herein merely serving to illustrate certain elements by which, in one embodiment, the invention may be effected.

What is claimed is:

1. The process of clarifying liquids, which includes adding to the liquid a neutral aqueous suspension of lignin free of cellulose, coagulating said lignin in the presence of the impurities of said liquid, and removing the coagulated lignin containing said impurities, said lignin being that which results from digesting cellulosic material in an alkaline solution, separating the cellulose from said solution, neutralizing said solution to precipitate the lignin therefrom, washing said lignin, and then forming the aforementioned neutral suspension of the lignin.

2. The process of clarifying liquids, which includes adding to the liquid a neutral aqueous suspension of lignin free of cellulose, coagulating said lignin by heating in the presence of the impurities of said liquid, and removing the coaglated lignin containing said impurities, said lignin being that which results from digesting cellulosic material in an alkaline solution, separating the cellulose from said solution, neutralizing said solution to precipitate the lignin therefrom, washing said lignin, and then forming the aforementioned neutral suspension of the lignin.

3. The process of clarifying liquids, which includes adding a neutral aqueous suspension of lignin free of cellulose, adding an alkali earth hydroxide to thereby coagulate the liquid in the presence of the impurities of said liquid, and removing the coagulated lignin containing said impurities, said lignin being that which results from digesting cellulosic material in an alkaline solution, separating the cellulose from said solution, neutralizing said solution to precipitate the lignin therefrom, washing said lignin, and then forming the aforementioned neutral suspension of the lignin.

4. The process of clarifying liquids, which includes adding to the liquid a liquid containing lignin free of acid and cellulose, coagulating said lignin in the presence of the impurities of said liquid, and removing the coagulated lignin containing said impurities, said lignin being that which results from digesting cellulosic material in an alkaline solution, separating the cellulose from said solution, neutralizing said solution to precipitate the lignin therefrom, washing said lignin, and then forming the aforementioned lignin containing liquid.

5. The process of clarifying liquids, which includes adding to the liquid an alkaline solution of lignin free of cellulose, adding an alkali hydroxide to thereby coagulate said lignin in the presence of the impurities of said liquid, and removing the coagulated lignin containing said impurities, said lignin being that which resulted from digesting cellulosic material in an alkaline solution, and separating the cellulose from said solution.

WYLY DEWEY NELSON.

REFERENCES CITED

The following references are of record in the file of this patent:

UNITED STATES PATENTS

| Number | Name | Date |
|---|---|---|
| 1,615,091 | Levy | Jan. 18, 1927 |
| 1,556,039 | Shilstone | Oct. 6, 1925 |
| 1,314,203 | Mumford | Aug. 26, 1919 |
| 1,176,999 | Wijnberg | Mar. 28, 1916 |
| 2,221,683 | Smit | Nov. 12, 1940 |
| 1,133,049 | McKee | Mar. 23, 1915 |
| 1,839,061 | Tellier | Dec. 29, 1931 |
| 2,280,600 | Muller | Apr. 21, 1942 |
| 2,261,917 | Pittman | Nov. 4, 1941 |
| 2,200,784 | Wallace | May 14, 1940 |